(12) United States Patent
Campbell et al.

(10) Patent No.: US 6,348,230 B1
(45) Date of Patent: Feb. 19, 2002

(54) EGG CONCENTRATE PRODUCT AND METHODS FOR MAKING AND UTILIZING THE SAME

(75) Inventors: James S. Campbell, Mount Lehman; Derk Te Bokkel, Carman; Clifford C. Fisher, New Westminister, all of (CA)

(73) Assignee: Canadian Inovatech, Inc., Abbotsford (CA)

( * ) Notice: Subject to any disclaimer, the term of this patent is extended or adjusted under 35 U.S.C. 154(b) by 0 days.

(21) Appl. No.: 09/410,463

(22) Filed: Oct. 1, 1999

Related U.S. Application Data

(60) Provisional application No. 60/102,676, filed on Oct. 1, 1998.

(51) Int. Cl.[7] .................................................. A23L 1/32
(52) U.S. Cl. ..................... 426/614; 426/330.1; 426/656
(58) Field of Search .............................. 426/614, 330.1, 426/656

(56) References Cited

U.S. PATENT DOCUMENTS 3,941,892 A * 3/1976 Glasser et al.
4,120,986 A * 10/1978 Lynn
4,803,084 A * 2/1989 Shine

* cited by examiner

Primary Examiner—Anthony J. Weier
(74) Attorney, Agent, or Firm—Robert B. Hughes; Hughes Law Firm, PLLC

(57) ABSTRACT

An egg concentrate having a higher percentage of solids relative to whole eggs. A liquid yolk component is mixed with a dried albumen component to form the egg concentrate. This can be reconstituted by mixing it with water, and this reconstituted egg product can be used itself as a food product, or mixed with other ingredients to make such things as bakery products, mayonnaise, etc. In one preferred embodiment, the concentrate is combined with an ingredient or ingredients (e.g. sugar and/or salt) to lower its water activity and make the concentrate shelf stable for relatively long periods (e.g. 2 months or much longer). In an alternative embodiment, another procedure is employed where a similar result of the dispersion of the powder in the yolk component is accomplished.

28 Claims, 5 Drawing Sheets

EGG CONCENTRATE PRODUCT AND METHODS FOR MAKING AND UTILIZING THE SAME

This application claims the benefit of U.S. Provisional Application No. 60/102,676, filed Oct. 1, 1998.

BACKGROUND OF THE INVENTION a) Field of the Invention

The present invention relates to an egg concentrate product and more particularly an egg concentrate product which substantially maintains the functional characteristics of whole eggs, and is convenient to use, and in a number of preferred embodiments has a long shelf life. The present invention also relates to a process of making such an egg product, and also a method of utilizing such an egg concentrate product in making bakery products and/or other food products where eggs are used.

b) Background Art

Fresh eggs are commonly prepared without being combined with any other food product, as in fried eggs, scrambled eggs, etc. Also eggs are commonly used in combination with other food ingredients to make various food products. Among such products are bakery food products, such as cakes, bread, muffins, pancakes, and also in making mayonnaise and other food products.

In general, shell eggs are considered to have quite desirable characteristics which contribute substantially to the quality of products such as cakes, mayonnaise, etc. Thus, cakes which are made "from scratch" are generally considered to be superior in comparison with, for example, cakes which are made from dried egg powder. Thus when dried egg powder is used in making a cake it may be desirable (or as a practical matter necessary) to add a certain amount of fresh egg product to make a desirable end product.

With regard to the use of eggs in bakery products (and also other food products), in addition to the taste and nutritional value provided by the eggs or egg products, eggs also can contribute as a foaming agent, an emulsifier, and a bonding agent (adding cohesiveness to the overall structure). In simpler terms, in acting as a foaming agent, the batter is able to be formed with "bubbles" when the product is subjected to shear by mixing. Then as the mixing continues, the larger bubbles are broken up into smaller bubbles. This increases the volume of the product, often to several times the original volume of the food product.

As an emulsifier, the eggs or egg products, can facilitate the mixing or dispersion of the ingredients. The cohesiveness which the egg product contributes relates its ability to act as a "glue" or bonding agent to maintain the food product as a foam structure. Thus, one of the desirable qualities in many types of cakes is for the cake structure to occupy a greater volume relative to its total weight, this being often referred to the "lightness" of the cake.

However, the use of fresh eggs in making such things as cakes is in some respects inconvenient and/or time consuming. This is particularly true in a high volume commercial operation where, a large quantity of eggs must be used for the batches of food product being produced. Accordingly, there have been various attempts over the last several decades to find ways to make the use of eggs or egg products more cost effective in a commercial operation.

When eggs are to be shipped to a commercial operation, quite commonly the whole egg is removed from the shell at the egg processing location and then shipped in refrigerated containers to be delivered to the user. Or the whole egg can be frozen and shipped to the operation. Thus, there are significant costs not only in the transportation of the egg product, but also the expense of maintaining refrigerating or freezing equipment at the point of use.

A possible alternative to refrigerating or freezing the eggs or egg product is to dehydrate the eggs or egg product to a powdered form so that it would have a longer shelf life. Also, the removal of the water content (thus reducing the weight of the egg product) lowers shipping costs. However, the drying of the fresh eggs results in loss of function, and sometimes in a substantial loss of function. The protein in albumen is a very complex material, and in drying it, it becomes reconfigured. The same is true of the yolk. Also, if the albumen and the yolk are dehydrated together, the two components would normally tend to combine with one another in a manner to result in a substantial loss of function.

For some commercial applications, the fresh whole eggs are treated in a manner to separate the yolk from the albumen. In a typical egg, the egg is made up of 33% "pure" liquid yolk and 67% "pure" liquid albumen. The albumen comprises 12% dry solids and 88% water.

With regard to the yolk, it is difficult to completely separate the yolk from all of the albumen. In a normal commercial operation where the yolk and albumen are separated some of the albumen will remain attached to the outer surface of the yolk, and the "separated" yolk is actually 33 parts "pure yolk" and 7 parts albumen. Thus, in a commercial sense when this separating process takes place, the albumen component is actually about 60% of the total egg mass, while the yolk component is 40% (33 parts yolk and 7 parts albumen). This 40 parts yolk is 43% solids and 57% water.

There are various commercial applications or use of the yolk by itself and also the albumen by itself. One obvious example of this is that the albumen of several eggs is used without the yolk to make an angel food cake. When the albumen is used separately as a food product, it is often dried before shipment. One of the obvious benefits of this is that since the unprocessed albumen is only 12% solid, dehydrating the albumen substantially reduces the shipping weight. (It should be noted, however, even after the albumen is dried there is still a residual water content which is bound more tightly in the albumen powder, and this is about 8% of the total weight of the dried albumen). Thus, when we include this 8% moisture of the 12% dried albumen, we find that in a theoretical sense that albumen is 89% water and 11% solids.

However, albumen powder is quite difficult to recombine with the water to bring it back close to its original form (12% solids and 88% water). In mixing the albumen powder with the water, the albumen powder tends to form into cohesive globules or particles, where the outer layer of the albumen becomes wet and forms a barrier to the dry albumen interior. Thus, these various globules or particles must be physically sheared to break through this outer "shell" and in turn form this globule into smaller particles, with these in turn forming an outer wet layer that has a smaller but yet dry interior. Thus, there is required greater mixing time and also a mixing apparatus which can apply greater shearing action to break up the particles.

Further, quite often the drying of the yolk usually causes a certain loss of "function" and taste. This loss of function can be reduced by using certain improved techniques in the process, but as a practical matter in a commercial environment, this still remains a drawback. This may also be true of dehydrating the albumen to a powdered form but improved processing substantially improves this.

When the egg is still in the shell (i.e. a shell egg) and delivered to the consumer as a shell egg, the egg is usually not pasteurized. However, when the egg is taken out of the shell, certain governmental regulations come into play, and this requires pasteurization. The pasteurization would normally exterminate or at least deactivate the pathogenic micro-organisms, and particularly salmonella. However, there may still be a certain amount of micro-organisms which, though not pathogenic, still have the capability of causing spoilage. Then, even though the whole egg or the yolk and/or albumen are pasteurized, in subsequent handling of the same, such as mixing and/or further processing, in a commercial operation it is often difficult to maintain proper isolation from micro-organisms that subsequently contaminate the egg product.

By way of further background information, the foaming capability of the whole egg and also the albumen separately and the yolk separately is of interest. The albumen, by itself has quite good foaming or whipping capability. However, when a small amount of yolk is added to the albumen (e.g. as little as 1% yolk to 99% albumen), the foaming ability is greatly diminished. Then when higher concentrations of yolk are provided, the foaming ability increases, until we have a pure yolk, without any albumen. The foaming capability of the yolk without albumen, is surprisingly about the same as the pure albumen.

The foaming capability is measured by what is called the "whip" test which is performed as follows. The basic whip procedure for the whip test used in determining the foaming characteristics of the egg product will be described later herein.

SUMMARY OF THE INVENTION

The liquid concentrate of the present invention comprises a liquid egg component, comprising liquid yolk, liquid albumen, or combinations thereof. It also comprises a particulate solid component selected from a group comprising animal derived protein, modified animal derived protein, vegetable derived protein, modified vegetable protein or combinations thereof. In a preferred form, the preferred particulate solid component comprises dried particulate albumen or particulate whey protein concentrate or combinations thereof.

The concentrate is characterized in that the particulate solid component is dispersed in the liquid egg component and the concentrate can be mixed with water to make a concentrate/water mixture.

In one embodiment, the liquid egg component comprises primarily egg yolk. In another embodiment the liquid component comprises predominantly albumen.

In the preferred form, the concentrate has a foaming capability such that when the product is subjected to a whip test, the specific gravity of the product developed by the whip test is no greater than about 0.6 and desirably no greater than 0.5, more desirably no greater than 0.4. The preferred range is about 0.25 and 0.35.

In another preferred embodiment, the concentrate further comprises an ingredient or ingredients which lowers water activity of the concentrate which substantially inhibits activity of the micro-organism to enhance shelf life of the concentrate.

More specifically, such ingredients to lower the water activity comprises sugar, sugars, salt, salts, and/or combinations of the same. The sugar can include sucrose, glucose, fructose, dextrose, lactose, maltodextrin and combinations thereof.

The salts include salt, calcium chloride, potassium chloride, citric, lactic, sorbic, malic, adipic, fumaric or other food grade organic acids, potassium sorbate, sodium or calcium proprionate, sodium benzoate.

In the method of making the liquid concentrate, there is first provided the liquid egg component as described above. The next step is the mixing of the particulate solid component with the liquid component, this being done to have a sufficient dispersion of the solid component so that the concentrate is characterized in that the concentrate made up of the particulate solid component and the liquid egg component can be readily mixed with water to make a concentrate/water mixture.

The present invention comprises also making a food product. This is accomplished by making the liquid concentrate in the manner described above. The water is added to the concentrate and is mixed therewith to make a reconstituted mixture, with the reconstituted mixture being combined with other ingredients to make the food product.

In one embodiment, at least one of the ingredients which is combined with the reconstituted mixture is flour and the food product is a bakery product.

In another embodiment the reconstituted mixture is mixed with ingredients to make mayonnaise.

Also, a preferred method of making the food product is to mix the water and the concentrate in a manner to cause these, either by themselves or in combination with other food ingredients, to foam, and the foam mixture is combined with the other ingredients to make a product having a foam structure.

Other features of the present invention will become obvious from the following detailed description.

DESCRIPTION OF THE PREFERRED EMBODIMENTS

A) Introduction

Figure 1:
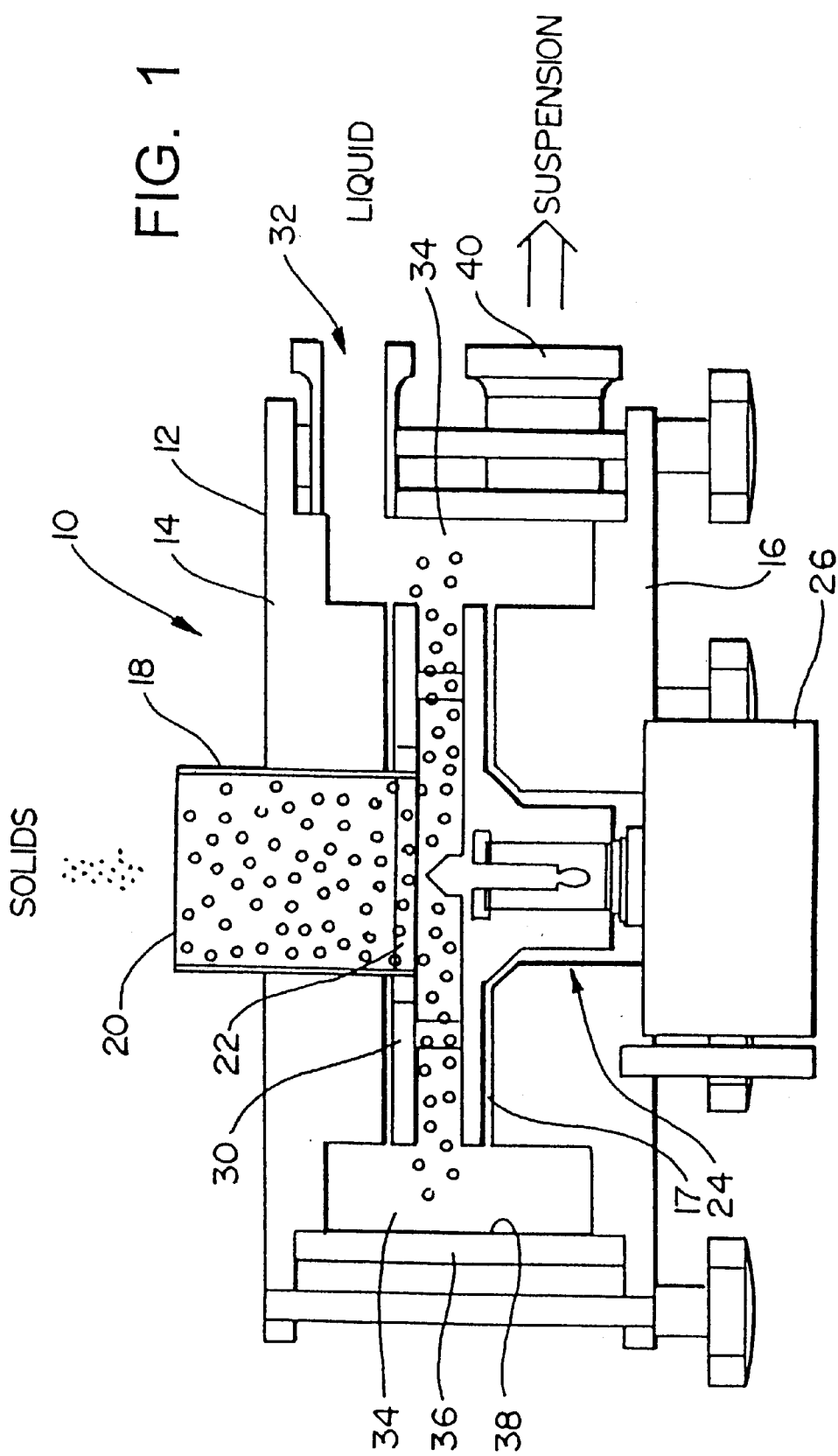
FIG. 1 is a somewhat schematic sectional view taken through the longitudinal center line of a first mixing apparatus which can be used in the present invention.

In general, the main goal of the present invention is to provide a liquid egg concentrate which can be manufactured and used in a commercially practical manner either by itself but more commonly in combination with other food ingredients, where the "function" of the egg is not lost. To state this in simpler terms, the egg concentrate of the present invention should be such that it can be used either by itself or in combination with whole eggs or other ingredients so that the end product is substantially indistinguishable from (or at least very much the same as) an end product made with pasteurized eggs. Also the egg concentrate should be such that the commercial process of making an end food product (such as mayonnaise, cake, etc.) can be practiced in a practical manner and also without any departure (or at least any substantial departure) from the usual commercial practices.

In the following text, the following terminology will be used:

a) Shell egg

This is the whole egg in the shell.

b) Whole egg.

The term "whole egg" will mean the entire egg or eggs, uncooked and removed from the shell. Commonly, the whole egg would be pasteurized, either by pasteurization of the entire whole egg or pasteurization of the yolk separately and the albumen separately if these have been separated from one another. Also this egg may have been frozen or refrigerated for a period of time.

c) Egg component.

The term "egg component" shall mean either the egg yolk, uncooked, or the egg albumen, liquid or dehydrated (uncooked). Again, these will at some stage of the process have been pasteurized, and the pasteurization will normally take place prior to the first processing of either or both of the components.

It will be recalled that earlier in this text that the albumen of the egg is by weight about 67% of the entire whole egg, and that the yolk is about 33% by weight of the entire whole egg. However, during the commercial separation process, the albumen in the amount of 7% of the total egg will remain attached to the yolk as a thin layer around the yolk. Since in the following text, the present invention is described in terms of being implemented in a commercial operation, the term "yolk", or "yolk component" will mean the yolk with the small amount of albumen attached thereto (i.e. the 33 parts yolk and 7 parts albumen). When the text is to describe the yolk without the attached albumen, then this will be referred to as "yolk component without the attached portion of albumen" or as "pure yolk".

In like manner, in the following description the term "albumen component" or "egg white component" is that portion of the albumen (which is 60% by weight of the whole egg) that has been separated from the yolk in a commercial operation. If there is any discussion of the entire amount of liquid albumen that is part of the whole egg (including the albumen attached to the egg), then this shall be specifically described as the "albumen component including the albumen that is attached to the separated egg yolk" or the "total albumen" or "total albumen component".

d) Solid and liquid egg components.

As indicated previously in this text, in a whole fresh egg, the albumen in about 88% water and about 12% solids when dried by usual commercial processes. Thus, the "liquid" albumen component shall be considered to be the 88% portion of the water, and the 12% by weight of powdered dry albumen shall be considered to be the solid component.

Further, as indicated previously in this text, when the albumen is dried to form an albumen powder, there remains in this dried albumen powder a certain amount of water that is about 8% by weight of the total mass of the dried albumen powder. Thus, in actuality when the albumen is dried and 88% by weight of the total albumen component has been removed as water, 1% or slightly less than 1% of the water remains with the powder. Nevertheless, the separated water component shall (comprising 88% water) will still be referred to as the "liquid component" or "component", and the solid albumen component shall be considered to be the 12% solid albumen component.

In the following text describing the preferred embodiments, the liquid yolk is not dehydrated in the process of making the egg concentrate of the present invention, except for brief discussions of the same in connection with the possible alternatives to the preferred commercial embodiments. Also, as indicated previously, the commercially separated yolk (i.e. 33 parts pure yolk and 7 parts liquid albumen) shall be considered the "yolk component". Unless this distinction is made in the text "liquid yolk component" the term "water component of the yolk" will be considered as the water that is retained in the yolk commercially separated (i.e. 33 parts pure yolk and 7 parts albumen) during the processing of the egg product and in the final egg concentrate product, and the yolk solids will include the solids of the 33 parts pure yolk and of the 7 parts of attached liquid albumen. Obviously, in the method of the present invention where the egg concentrate is included in a bakery mix and baked or otherwise cooked there will generally be a loss of some moisture but the definitions and the distinctions made above do not refer to that particular loss of water.

B) First Embodiment

In this first embodiment, in the preferred form there is first provided the quantities of the yolk component and the albumen component of whole eggs which have been commercially separated from each other. On the assumption that the end product is going to be the equivalent of a whole fresh egg without loss of function (in terms of the solids content), there would be 40% yolk component (in a commercial sense incorporating 33 parts by weight of the yolk of the whole egg and 7 parts of the liquid albumen) and the albumen component (60% by weight of the total egg).

The albumen component is dehydrated to remove about 88% of the water and leave an albumen powder. This can be done by a conventional commercial process, such as spray drying, so that the albumen powder is in the form of relatively fine particles. In a commercial operation, the albumen component would quite possibly be provided to the processing cite as powdered albumen which had previously been prepared. The dried egg albumen could also be made by being belt or freeze dried or possibly dried by some other method. It could have been pasteurized in liquid prior to drying or in the dried form. Also, within the broader scope it could possibly contain approved additives to improve whip or modify other functional properties, such as SLS (Sodium Lauryl Sulphate) or Sodium Citrate.

The process in making the egg concentrate of this first embodiment is to mix the dried powdered albumen component into the yolk component in a manner that these are intimately mixed (i.e. there is a sufficient degree of dispersion of the albumen particles in the yolk). It is desirable that this be accomplished in a manner to limit the amount of air that is entrained in the mixture. In this first preferred embodiment, two commercial mixing machines have been found to work quite satisfactorily in the present invention. These are as follows:

1) First Mixing Apparatus

This first apparatus which this intimate mixture of dried albumen and yolk concentrate is prepared is currently marketed under the designation "CENTRISOL" injector, and is sold in the United States by Bran+Lubbe, Inc. located in Buffalo Grove, Ill.

With reference to FIG. 1, it can be seen that this mixing apparatus 10 comprises a cylindrical housing 12 made up Of lower and upper sections 14 and 16 respectively. The housing sections 14 and 16 are spaced a short distance vertically from one another to form a central horizontally aligned dispersion region 17. The upper housing section 16 has a central inlet pipe or conduit 18 having an upper infeed end 20 and a lower outlet end 22. Mounted to the lower housing section 17 is a rotary impeller device generally designated 24. This comprises a motor 26 centrally located below the housing section 16, and extending upwardly from the motor 26 is a shaft 28. Mounted the shaft 28 is an impeller 30 which is horizontally aligned and rotates in the dispersion region 17 at a high velocity about the central axis of the shaft 28.

The particulate material to be mixed (i.e. the dried albumen compound) is fed into the inlet end 20 of the conduit 18 to drop into the central part of the dispersion region 17. At the same time the liquid material to be mixed (i.e. the yolk premix) is directed through a passageway 32 into a circumferential region 34 surrounded by a cylindrical outer wall 36. The impeller 30 causes the dried albumen particles to travel radially outwardly at a relatively high velocity to impinge upon the cylindrical wall surface 38. The yolk liquid in the circumferential region 34 mixes with the albumen particles. The resulting liquid mix is discharged through an outlet opening 40.

2) Second Mixing Apparatus

This second mixing apparatus is currently marketed under the trademark "Quadro Ytron", which is provided by Quadro, Inc., located in Millburn, N.J., USA and/or Quadro Process, Inc. of Waterloo, Ontario, Canada.

Figure 2:
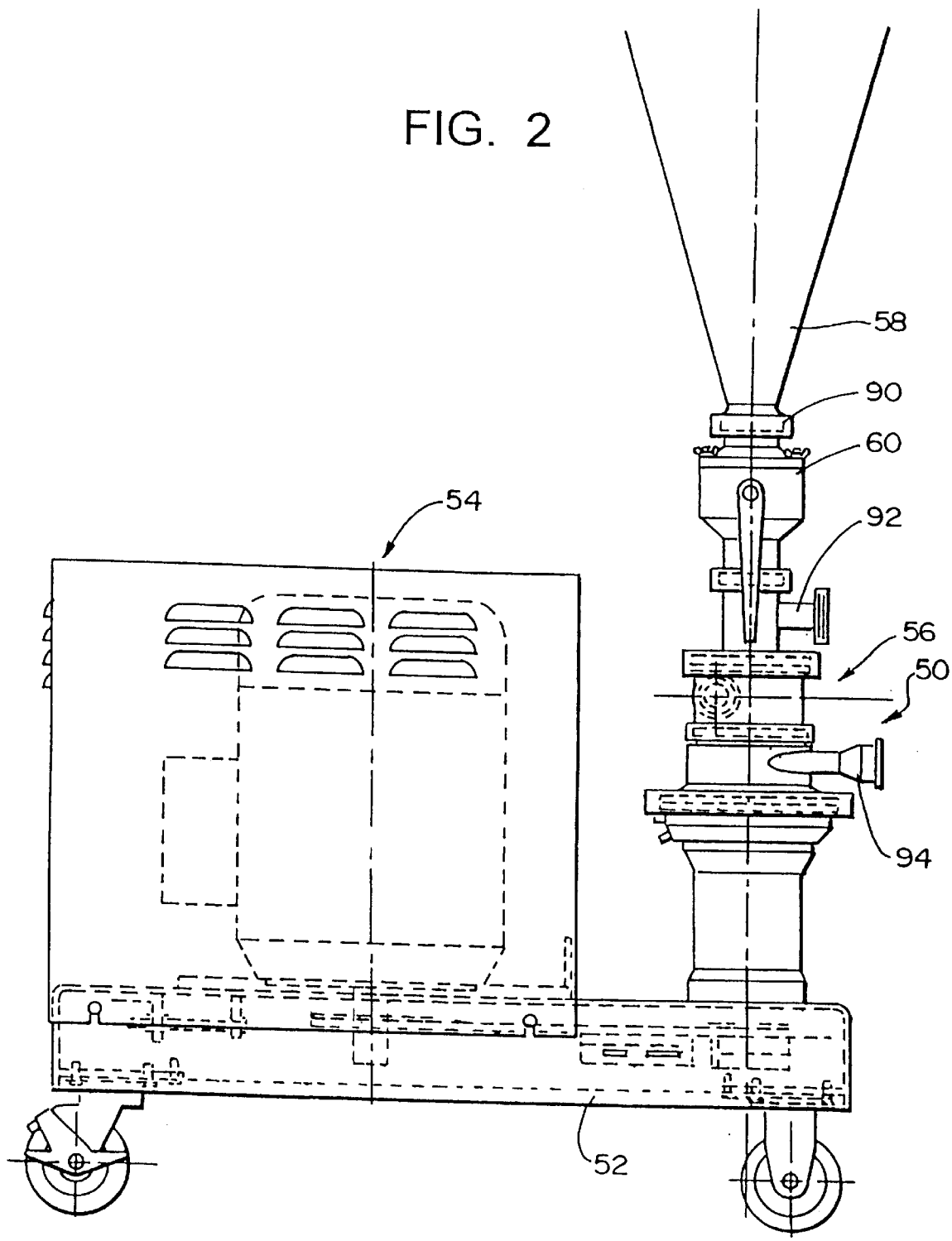
FIG. 2 is a side elevational view of a second mixer apparatus which can be used in the present invention.
Figure 3:
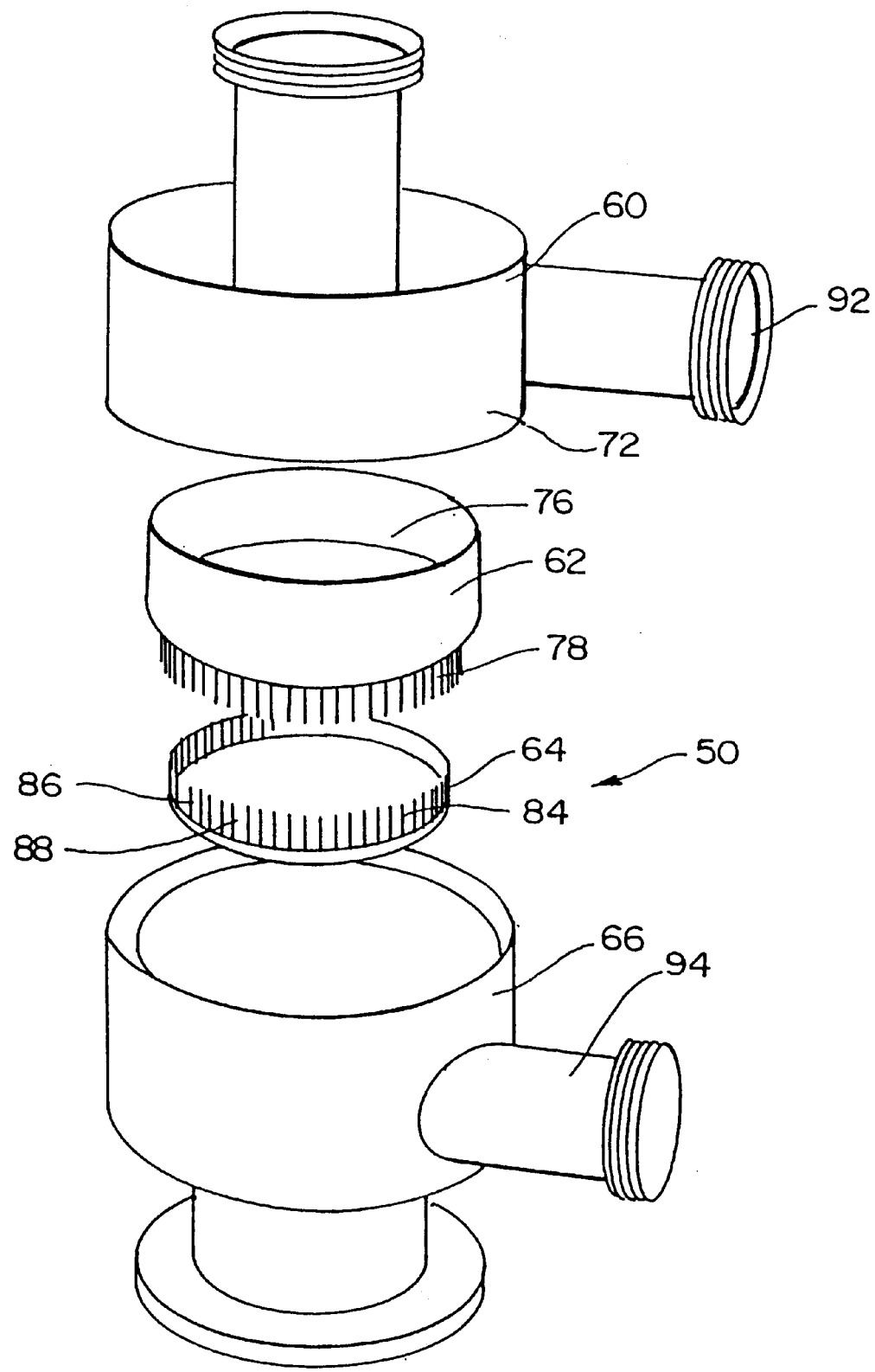
FIG. 3 is an exploded isometric view of the mixing section of the apparatus of FIG. 2.
Figure 4:
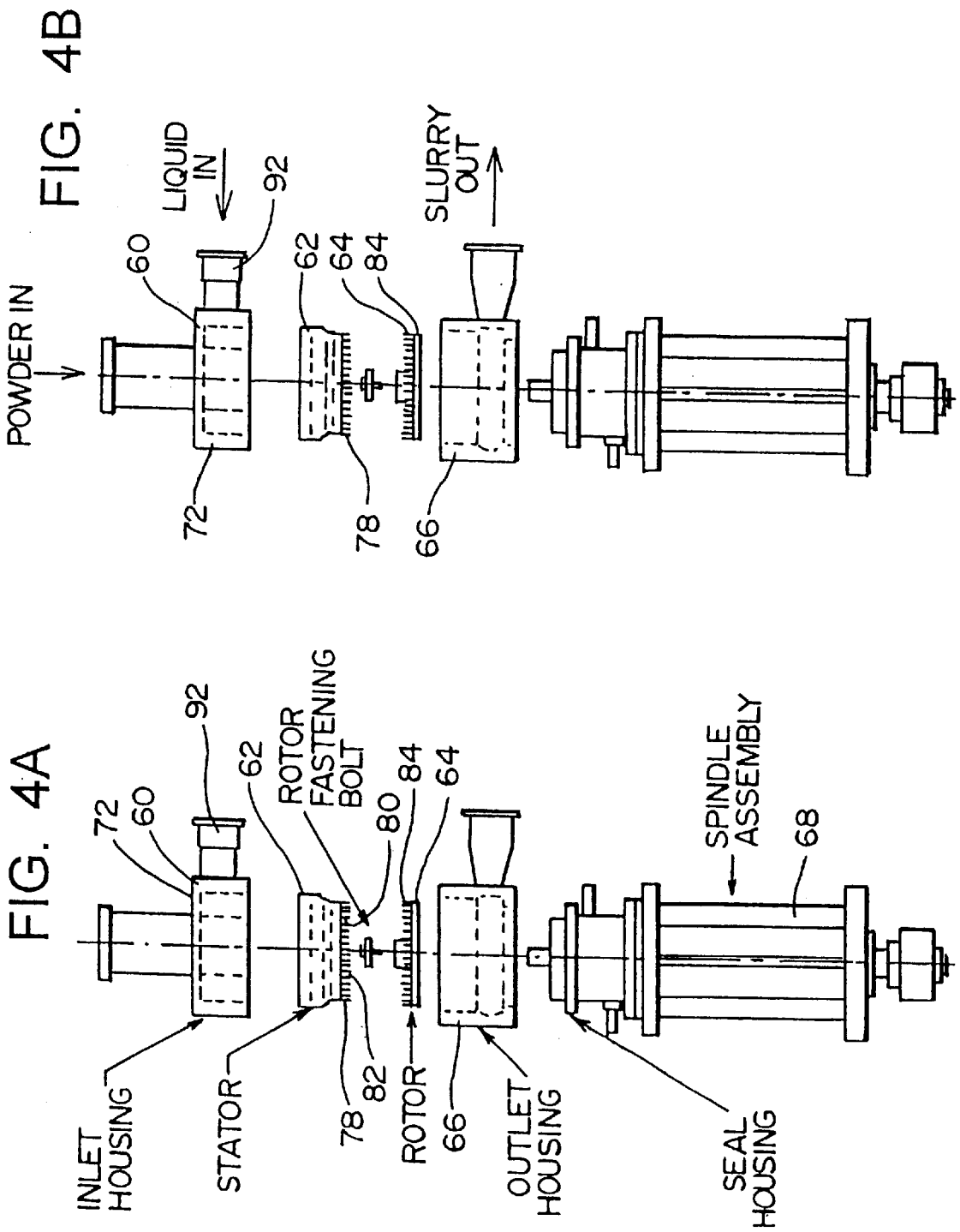
FIGS. 4A and 4B are substantially identical exploded side elevational views, with FIG. 4A being labeled to indicate the main components, and FIG. 4B being labeled to indicate the main operating functions.

With reference to FIGS. 2, 3, and 4, 4A and 4B, it can be seen that this apparatus 50 comprises a base member 52, a motor section 54 and a mixing section 56 (a portion of which is shown in FIG. 2), the latter two being mounted to the base 52. The mixing section 56 comprises a hopper 58 which receives the dried albumen component which is directed from the hopper 58 into the upper end of an inlet housing 60. Mounted in the inlet housing 60 is a stator 62 which operates in conjunction with a rotor 64, with the stator 62 and the rotor 64 both having a concentric circular configuration and rotating about the same vertical axis. The rotor 64 is mounted at the top part of the outlet housing 66, and extending upwardly to the housing 66 is a lower spindle assembly 68 that engages the rotor 64 and causes rotation of the same, this spindle assemble 68 being driven from the motor section 54.

The inlet housing 60 has generally a cylindrical configuration and comprises a cylindrical side wall 72 in which is mounted the aforementioned stator 62. The stator 62 has an upper somewhat circularly shaped portion 74 which defines an inlet chamber 76. At the lower part of the stator, there is a plurality of mixing elements 78 which are at evenly spaced circumferential locations around the stator 62. More particularly, these mixing elements 78 are vertically aligned shear members, each having an inner shear surface 80, with the shear surfaces being spaced circumferentially from one another to define open regions 82 between each pair of elements 78.

The rotor 64 has a plurality of rotor circumferentially spaced rotor mixing elements 84, each having an outer shear surface 86 with open regions 88 positioned therebetween. The rotor mixing elements 86 are located inside the stator mixing elements 82. The two sets of shear surface 80 and 86 are dimensioned so as to create a circumferential shear space of a very small radial dimension.

The inlet hopper 58 connects at 90 to the upper end of the inlet housing 60, and directs the particulate albumen into the inlet chamber 76 through suitably arranged discharge openings. The liquid yolk component enters the inlet chamber 76 through an inlet member 92 defining an inlet passageway which is aligned so as to be offset from the longitudinal center axis of the inlet chamber 76 so as to direct the yolk in a tangentially aligned direction into the chamber 76 so that the yolk travels in a generally circular or spiral path within the chamber 76.

The liquid yolk component and the powdered albumen descend from the inlet chamber 76 to pass between the mixing elements 78 of the stator 72 and the mixing elements 84 of the rotor 64. The rotational movement of the rotor causes the adjacent shear surfaces 80 and 86 to produce a mixing action of the particulate albumen material with the liquid yolk. The mixture then travels further downwardly in the rotor housing 66 to be discharged through an outlet member 94 which defines an outlet passageway which is along an alignment axis that is offset from the center axis of the rotor housing 66.

It has been found that each mixing apparatus as described above is able to provide the mixing of the albumen powder and the liquid yolk so that the result is an intimate mixture where there is sufficient dispersion of the albumen powder in the yolk component to produce an egg concentrate that maintains the functions of a fresh egg. Further, the mixing can be accomplished by each apparatus in a manner that the output of the mixed product is of sufficient quantity to satisfy requirement of a commercial operation.

Also, while these two types of apparatus have been described as being suitable for use in the present invention, other mixing machines or techniques could be used where the mixing/shearing capability is sufficient to obtain the dispersion required.

It should be noted that it is possible to achieve most of the benefit (or substantially most of the benefit) of the present invention by a careful mixing of the albumen powder with the liquid egg by placing the egg in a bowl and feeding the albumen powder into the liquid yolk slowly, while mixing the yolk with a high shear hand held mixer, such as Braun household type mixer with variable speed. However, this has been accomplished only in a laboratory bench setting, and one drawback of this is that a larger amount of ambient air is drawn into the mixture. Further, it has been found that the subsequent test results of using such a mixture where it is made by the hand held mixer do not have the total function of the whole egg.

On the assumption that the yolk component is made up of 40% of the total whole egg (33 parts yolk and 7 parts liquid albumen) and comprises 57% liquid and 43% solids, and that the 60% albumen component to be added is totally dehydrated to only 7.2 parts by weight of dry albumen powder (so as to contain only 8% bound water in the powdered albumen), if we consider the total mass of the whole egg to be 100 parts, the components of the concentrate of the present invention are 23.8 parts solids and 23.4 parts liquid, for a total of 47.2 parts. Carrying out these calculations, the end mixture of the present invention comprises about 50% water, and 50% dry solids.

Therefore, to add the amount of water which would be needed to later bring the concentrate to the liquid content of the whole egg, it would be necessary to add about 11 parts water to 10 parts yolk/albumen concentrate to arrive at the comparable ratio and to "recreate" the egg product comparable to the whole egg. It is evident that these ratios can be changed without departing from the present invention, and this will depend upon various factors. For example, if it were desired to reduce the amount of yolk component relative to the amount of albumen component (possibly to reduce the cholesterol or the fat content of the concentrate), a greater amount of albumen would be provided in comparison with the amount of yolk.

In the example given above, with the liquid yolk being 40 parts of the 100 part full egg amount, the amount of dried albumen powder is 7.2 parts by weight (with 52.8 parts of water being removed). This 7.2 parts of dried albumen that is added would thus be about 18% of the total egg concentrate. This 18% could obviously be increased substantially (or decreased). For example, the percent of the amount of dried albumen which would be added to the liquid egg component could be increased to 20%, 25%, and upwardly by increments of 5% and up to the vicinity of about 30 to 35 percent. It has been found that at a level as high as about 22 to 25 percent, the total percentage of solids in the egg concentrate becomes sufficiently high so that instead of being a pourable liquid, it becomes more of a paste. While this paste-like composition could be used, the egg concentrate, as a commercial product, is more desirably in a pourable liquid form.

On the other hand, for some applications, the percentage of albumen powder used may be made less. For example, the concentration of the albumen powder could be lowered from 18% to possibly 16%, 14%, 12%, 10%, and possibly lower. Then, the amount of water which is added to make up for the water that had been removed to form the dry albumen would be less, and some of the practical commercial advantages of the present invention would be diminished.

If the yolk component and the dry albumen component are both pasteurized, and if the process is carried out in a clean environment so that additional micro-organisms are not introduced into the concentrate, then the concentrate can be expected to have a reasonable shelf life. However, in a commercial environment where the mixing must be accomplished on a commercial scale and the other processing steps may be performed, it is difficult to maintain this level of purity. Thus, the concentrate of this first embodiment would normally not be stored for any long period of time and would be used quickly.

For example, the concentrate could be used to make a pure egg food product (e.g. scrambled eggs or an egg omelet). Or the concentrate could used in some other process to make, for example, a bakery food product (cake or muffins) or some other food product, such as mayonnaise, where there would be subsequent sterilization. It would be difficult to further pasteurize the egg concentrate since at this relatively low level of liquid content, the pasteurizing temperatures which would normally be required would be sufficiently high so that there would be a cooking of the egg or at least a partial cooking of the concentrated egg mixture.

Therefore, in a practical commercial environment, this first embodiment would normally be accomplished where the overall operation is such that the egg concentrate would not be stored for a prolonged length of time. Or if it is stored, this could be done in a frozen state or refrigerated state.

The egg concentrate of the first embodiment was tested to ascertain its foaming characteristics (by means of whip test), and also to use the egg concentrate on making various baking products. It has been found that in each instance the foaming capability of the egg concentrate is substantially the same as that of the comparable pasteurized whole egg product. Further, in making bakery products, such as cake and muffins, the end food product is substantially the same as that made with fresh whole eggs. More specifically, the controlled bakery product was compared with the bakery product made with the concentrate of the present invention, and the various items of the controlled baking products are substantially indistinguishable with those made in accordance with the present invention. The manner in which the whip test is accomplished is as follows.

Liquid Egg
1) Place 200 gm. of sugar and 200 gm. of liquid egg in bowl of Hobart N-50 mixer using whip attachment.
2) Whip 5 minutes on number 3 speed.
3) Measure Specific Gravity using gravity cup.

Dried Egg
1) For egg powder, convert usage rate to equivalent of 200 gm. final liquid; e.g. usage rate of 24.5% equates to 49 gm. of powder and 151 gm. of water.
2) Dry blend 200 gm. of sugar with egg powder.
3) Add one-half of water and mix 2 minutes on number 1 speed.
4) Add balance of water and mix 1 minute on number 2 speed.
5) Whip 5 minutes on number 3 speed.
6) Measure Specific Gravity using gravity cup.

Egg Concentrate (For concentrate consisting essentially of liquid egg component and dry particulate component).
1) For concentrate, convert usage rate to an equivalent of 200 grams final liquid; e.g. concentrate containing 49% equates to 100 grams of concentrate and 100 grams of water.
2) Blend concentrate and ½ of water with 200 grams of sugar.
3) Add balance of water and mix 1 minute on number 1 speed.
4) Whip 5 minutes on number 3 speed.
5) Measure specific gravity taps using gravity cup.

To determine whether the function of the egg has been lost when made as the egg concentrate of this first embodiment, the egg product made in accordance with this first embodiment was used to bake a sponge cake. More specifically, about 280 grams of the liquid egg concentrate was placed in a bowl, and there was added 190 grams of sugar, and also an amount of water (about 250 grams) which would bring the overall content of the liquid egg concentrate back to the level of whole eggs. This was mixed using a Hobart mixer at 1 minute at lower speeds and then 4 minutes at a higher speed, and then 30 grams of oil, 20 grams of liquid milk and 150 grams of cake flour were added into the liquid egg/sugar foamed mixture and simply mixed by hand to form the cake batter. The sponge cake that was baked using the egg concentrate of the present invention was substantially indistinguishable from the sponge cake made with the exact same sponge cake formulation, where in the control cake whole liquid eggs were used.

The "degree" of the mixing of the dried powdered albumen component or dried powder component of whey protein concentrate or some other substance (which could also be called the degree of dispersion) is difficult to measure quantitatively, but can be determined indirectly by relating its foaming capability by means of this whip test. Since the specific gravity of the material that is submitted to the whip test is a measure of its capability of foaming, and the foam characteristics of the preferred embodiments of the present that has retained adequate function of the whole egg would have a specific gravity between about 0.25 to 0.35. If the specific gravity is somewhat higher, this would indicate that the foaming capability is lower. For most commercial applications of the present invention, the specific gravity resulting from the whip test would desirably not be above 0.40 and more desirably not above about 0.35. For some applications where a greater density of the end product is feasible, this specific gravity could be possibly as high as about 0.5, or possibly as high as 0.6. However, in general, specific gravities higher than this would normally not be satisfactory for the commercial use of the egg concentrate of the present invention.

C) Second Embodiment

The second embodiment of the present invention is accomplished in substantially the same manner as the first embodiment, except that the albumen of the egg is used as both the liquid egg component and also the dry egg component. In this embodiment, a quantity of liquid egg component is mixed with the dry egg component in the same manner as described in the first embodiment. For example, the 50 parts by weight liquid albumen component could be mixed with six parts by weight of the dry albumen component. Since the dry albumen component would be about 92% solids and 8% water, and the liquid albumen component would be 89% dry solids and 11% water, the mixture of the solid albumen component, the liquid concentrate would in total be about 45 parts water and 11 parts albumen solids.

Obviously, the percentages of dried albumen powder and liquid albumen could be varied. For example, the percentage of liquid to dry albumen could be increased from 6 parts dried albumen to 50 parts liquid albumen so that the ratio would be 8 to 50, 10 to 50, 12 to 50, and upwardly by 2-part increments to where the increments would be the amount of liquid albumen would be equal to the amount dried albumen powder added. In general, however, when this ratio would become about 50 to 50, the concentrate becomes rather viscous and more difficult to handle. Also, as less and less liquid albumen is added as part of the mixture, then the end concentrate becomes more like a powdered albumen. In general, the desired ratio of liquid albumen to dried albumen would be between about 3 to 1, to about 2 to 1, with 2 to 1 being a preferred ratio, but the ratio could also be made as high as 10 to 1, 8 to 1, 6 to 1, or 4to 1, or as low as 1 to 1.

As indicated above, the liquid and dry albumen components are mixed together as described relative to the first embodiment, and then these can later be used to make another food product, such as a bakery food product. If an angel food cake is to be made with this type of mix, then the albumen concentrate would be simply rehydrated by mixing the concentrate with a suitable amount of water to restore to its normal "whole egg" mode, and then it would be used in a usual manner to make an angel food cake mix.

It has been found that the egg concentrate of this second embodiment can readily be hydrated by mixing in the additional water for only a minute or less. Further, this concentrated egg albumen product has been found to have lost substantially none of the activity of the original egg albumen, or only a very small amount of the function of the original egg albumen.

D) Third Embodiment

For this third embodiment, the same method is followed as in the first and second embodiment, except that the liquid component is made up of both liquid albumen and also liquid yolk. The powdered component (i.e. dried albumen) and the liquid component are mixed in substantially the same way as described above. Then in reconstituting the liquid egg concentrate, the amount of water would be added which would bring the end mixture back to the original water content if the egg product were simply the quantity of liquid yolk and liquid albumen combined.

It is to be recognized that in this third embodiment, as well as in the other embodiments and subsequent embodiments of this invention, it is not always required to reconstitute the liquid concentrate to the liquid levels that would be present in an original egg, and this would depend upon the particular application. For example, the concentrate may be used in some subsequent food product where water is required, in addition to the water present in the whole egg. In that instance, in reconstituting the egg concentrate, a greater amount of water could be used so that the total water is not only that which would be expected to be present in the whole egg product, but also the additional water for that particular use. On the other hand, if the end food product in which the egg concentrate is to be used would benefit by having a lesser amount of water, then the advantage of the present invention would be that it might be possible to use the egg concentrate itself in the final food product without adding any water. Or a lesser amount of water could be added that would be necessary to reconstitute the egg concentrate where it would have the amount of water comparable to a fresh whole egg.

E) Fourth Embodiment

This fourth embodiment is similar to the first three embodiments in that there is a liquid egg component which can be a liquid yolk component, a liquid albumen component, or a combination yolk and liquid albumen component. Also, as in the prior three embodiments, there is also the powdered or particulate solid component which in this particular embodiment is dried albumen in particulate form.

However, this fourth embodiment differs from the prior embodiments in that additional ingredients are added to the egg concentrate to lower the water activity and thus provide the egg concentrate with a rather long shelf life. The ingredients that are added to the liquid egg concentrate premix are in the preferred embodiment primarily sugar, salt and/or combinations thereof. As will be explained later herein, other ingredients could be used to lower the water activity and obtain the benefits of the present invention, but commonly ingredients which would desirably become part of the end product for which the product is to be used would desirably be incorporated in the premix. For example, sugar (and also some amount of salt) is generally a component of a cake mix. Accordingly, an amount of sugar and/or salt could be incorporated in the egg concentrate of the present invention and that amount of sugar and/or salt which is incorporated in the egg concentrate would simply be subtracted form the sugar and/or salt which would be used in the end recipe for the cake mix.

With regard to the method of making the egg concentrate of this fourth embodiment, the liquid egg component is provided as the first embodiment. Then the dried albumen component is provided in the quantities specified in the first embodiment as indicated previously. In this preferred embodiment in order to obtain the proportions that would exist in the comparable whole egg product, the amount of a dried albumen added would be that which would be equal to that of albumen solid so that would be in the liquid albumen of the whole egg. However, this could be varied in the same manner as described in the first embodiment.

In addition, the additional component that would lower the water activity is added to this mixture. Since in many of the preferred embodiments, the main component which is added to lower the water activity of sugar, in the following description, this will be simply be referred to as "sugar", with the understanding that other water activity lowering components could be used.

The sugar could be added to the mixture in one of three ways. First, the sugar could be mixed with the liquid egg component. The sugar readily mixes with the liquid egg component since the sugar dissolves into the water of the liquid component and thus becomes well dispersed therein. Alternatively, the sugar in a granulated form could be added to the dried albumen, and then the dried albumen/sugar mix could be directed into the mixing machine (two such mixing machines described previously relative to the first embodiment). Third, after the albumen powder has been mixed with the liquid egg component to make an intimate mixture of the powdered egg albumen and the liquid component, the sugar can then be added. In each instance, it has been found that the sugar component can readily be combined with the original liquid egg component and the powdered albumen.

The effect of adding this sugar (or other water activity reducing compound) is to lower the water activity of the concentrate. If the water activity is reduced to a sufficiently low level, this will inactivate the micro-organisms which are in the egg concentrate. It has been verified that this reduction of activity of the micro-organisms is able to prolong the shelf life of the resulting egg concentrate to a length of at least 2 months, and even up to 6–12 months or longer.

To discuss the phenomena involved, it is known that when various substances are dissolved in water, the boiling point of the water at a given pressure (e.g. atmospheric pressure) rises. This is attributed to the decrease of the "activity" of the water which in turn means that the water molecules are less prone to separate from the body of water by evaporation. It is surmised that the bipolar water molecules become more closely "bound" to the dissolved material so as to be less susceptible to being separated.

This is the physical phenomenon which relates also to the phenomenon of osmotic pressure. It is also known that if a vertical membrane separates, two bodies of water, one being pure water, and the other being a water solution with lower water activity, the water from the pure body of water will migrate through the membrane into the water that has the substance dissolved therein (e.g. sugar, salt, etc.) so that the elevation of the water in solution rises to a higher level than that of the pure water. This is surmised to be due to there being a higher concentration of unbound water molecules in the pure water which are more free to migrate through the membrane.

Now let us relate this to the method of the present invention. The micro-organisms that exist in the egg concentrate accomplish liquid exchange by excreting outwardly through the membrane of the micro-organism and taking water in through the membrane of the micro-organism. However, if the water activity in the liquid surrounding the membrane is reduced to a sufficiently low level, the liquid (i.e. water plus other dissolved substances) in the micro-organism will not be able to take in the surrounding water. Such transfer of water liquid is necessary for the micro-organism to carry out its normal functions, especially growth. The result is that as a minimum the micro-organism is inactivated so that it in effect remains dormant and does not multiply, or possibly the life of the micro-organism is terminated. Either way, the practical effect is that this inactivation or deactivation of the micro-organisms prevents the egg concentrate from spoiling.

When the egg concentrate is refrigerated, the water activity should be at least as low as about 91. If it is not refrigerated, the water activity should be at least as low as about 85. The term "water activity" is defined in Section 113.3 entitled "Definitions of subpart A (general provisions) of Section 113 of the CFR relating to the U.S. Food & Drug Administration", this being as follows:

"Water activity is the measure of the free moisture in a product and is the quotient of the water vapor pressure of the substance divided by the water pressure of pure water at the same temperature."

In this fourth embodiment, as indicated previously, the process of making the egg concentrate is substantially the same as described with respect to the first embodiment except that the sugar and/or salt or other water deactivating substance is added to the dry particulate albumen to be mixed in the liquid yolk component to make the liquid concentrate. With the sugar and/or salt added, there would be an increased amount of the solid component, however. One of the advantages of providing this liquid concentrate of this fourth embodiment is that it can be packaged and stored at room temperature for months without deteriorating.

With a substantial amount of the water removed from the egg concentrate, a lesser amount of the sugar is needed to bring the water to a sufficiently low activity level. This results in lower weight overall of the concentrate. Also, the egg concentrate of the present invention does not need to be cooled or refrigerated. Further, it is contained in a liquid form and can be conveniently used by pouring it into a mixture which is to become the end food product (e.g. a bakery product or the like). If the sugar which is used is in liquid form (i.e. glucose or other liquid sugar) then the liquid sugar could be mixed in with the mixture that is taken from the mixing apparatus. This liquid sugar combines readily with the egg concentrate goes into solution with the water of the liquid concentrate.

The sugar which could be used can in most instances be any sugar which would lower the water activity. This would include sucrose, glucose, fructose, dextrose, lactose or maltodextrin.

Also, the salt which could be used to lower the water activity could be normal table salt (sodium-chloride), calcium-chloride, potassium-chloride, etc.) Also, various acids could be used, such as citric, lactic, sorbic, malic, adipic, fumeric, or other food grade organic acids. Also, potassium-sorbate, sodium or calcium-propionate, sodium-benzoate, or other ionic food preservatives might be added.

Figure 5:
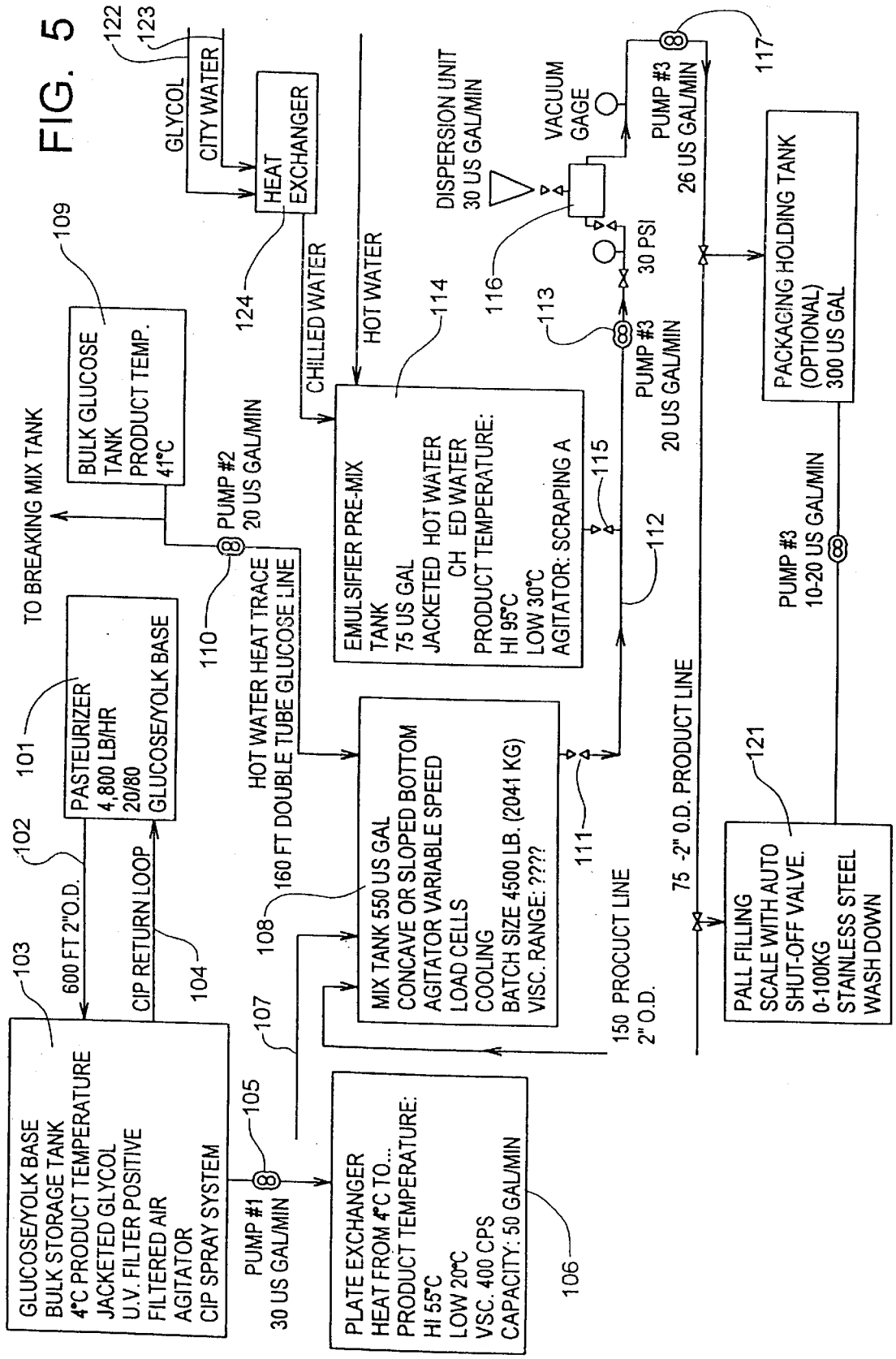
FIG. 5 is a blocked diagram illustrating a commercial process of the fourth embodiment of the present invention.

A commercial process for making an egg concentrate in accordance with this fourth embodiment is illustrated in the block diagram of FIG. 5. The process begins where the liquid egg component (yolk plus the attached albumen) is directed to the pasteurizer 101 where it is subjected to the normal pasteurizing process. Glucose is added to the yolk to lower its water activity so as to inhibit growth of micro-organisms. From the pasteurizer the liquid yolk is directed through the line 102 to a storage tank 103. The liquid yolk component is stored at a suitable temperature (e.g. 4° C.).

In the flow diagram, there is shown a return line 104, which is not used in the normal production process, but is used primarily during a cleaning operation where the pasteurizing apparatus and also the storage tank 103 are being cleaned. The liquid is circulated through the line 102 to the storage tank 103 and back to the line 104 to the pasteurizing apparatus 101.

The liquid yolk component from the storage tank 103 is directed through a valve 105 to a plate heat exchanger 106. This plate heat exchanger 106 is used primarily in circumstances where an emulsifier is to be added. Many emulsifiers are desirably added only when at a somewhat higher temperature. Accordingly, as indicated in the block diagram, the plate heat exchanger 106 would heat the liquid component to a temperature between 4° C. to 55° C. (this given simply by way of example and not necessarily being the only precise temperature range).

The liquid yolk component is then directed through the line 107 to the mix tank 108 where the sugar is added to the liquid egg component. It will be noted that there is also shown a line 109 by which liquid glucose can be added to the yolk component, this being accomplished by the pump 110. The solid sugar (e.g. granulated sucrose) could simply be added to the tank 108 by conventional means, or even be added manually by dumpling container quantities of the sucrose into the tank 108.

The yolk with the sucrose is directed through the valve 111, through the line 112 and to the pump 113. If emulsifier is to be added to the liquid yolk component, this is done by directing the emulsifier from the emulsifier premix tank 114 through the line 115 and into the line 112 upstream of the pump 113. By way of example, emulsifiers which could be used are the following: Mono-and Di-Glycerides, PGME, DATEM, SSL, Polyglycerol esters, Polyoxyethylene Stearates, Sorbitan Fatty Acid Esters, and Polysorbates.

The pump 113 pumps the liquid yolk into the mixing apparatus which is schematically shown at 116. There is shown schematically the hopper to direct the solid particulate dried albumen and any amount of granulated sugar which is added to the product by directing the granulated material (e.g. sucrose) into the mixing apparatus 116.

The discharge of the liquid product from the apparatus 116 is directed to a pump 117 and thence to the valve 118. The valve 118 can be positioned so as to direct the liquid concentrate into the packaging holding tank 119. Then the egg concentrate is selectively moved by the pump 120 to the filling and packaging location 121. Pressure gauges are provided at 122. Liquid inlet lines are indicated at 123 to direct either hot water or chilled water into the emulsifier premixed tank, and glycol and/or water can also be directed into a heat exchanger shown at 124.

F) Fifth Embodiment

In this fifth embodiment, instead of using 100% dried albumen powder in making the egg concentrate of the present invention, whey protein concentrate was used as the dry albumen powder component of the mixture. Whey protein concentrate of 34% and also whey protein concentrate of 80% were both used and found to work satisfactorily. 50% of whey protein concentrate was mixed with 50% of the dried albumen concentrate (thus having the dry concentrate being equal parts dried egg albumen and 50 parts whey protein concentrate, and this was combined with the liquid egg component as described in the fourth embodiment to make the egg concentrate of the present invention.

Also the whey protein concentrate was substituted for the entire amount of the dried albumen component, and this was used to make the egg concentrate of the present invention as in the fourth embodiment.

The resulting concentrate is a somewhat different food product than that made from the liquid egg yolk and the dried albumen concentrate, in that its taste is somewhat different. However, it has been found to make a quite desirable food concentrate. The manner of manufacture is substantially the same as described in this text with reference to the several embodiments. Also, this concentrate made with the whey protein concentrate has been found to be able to be readily mixed with water to reconstitute the concentrate. Further, this has been used in making various bakery food products with good results.

Within the broader scope of the present invention, there are additional candidates which could be used as substitutes for the dried powder albumen. These would be animal protein products (modified or unmodified), such as proteins derived from blood plasma or derived from the meat of the animal, modified or regular milk proteins. Soy protein is a possible substitute (modified or unmodified), and/or other vegetable proteins, such as proteins derived from legumes, grains, seeds, and other vegetable products. Various proteins have been or are being developed which mimic or resemble the protein of the egg albumen, and these would be candidates.

G) Sixth Embodiment

This sixth embodiment of the present invention is a different method of arriving at an egg concentrate which like the earlier embodiments maintains the function of the whole fresh egg. Also this sixth embodiment has the capability of being recombined with water and being used as a product or in conjunction with other food components to make a bakery product or the like.

In this sixth embodiment, there are four main steps, namely:

a. preparing an emulsifier slurry premix, which is a combination of an emulsifier and water, and possibly other ingredients.

This is accomplished by first heating a quantity of water, adding a quantity of sugar and stirring this until it is dissolved, then adding a quantity of emulsifiers and stirring to form an emulsifier liquid mixture (an emulsifier slurry mixture). This resulting liquid mixture is the held in a cool area.

b. Preparing a liquid yolk premix

The liquid yolk (i.e. raw yolk) is desirably first mixed with salt and then pasteurized. Then this is pumped into a holding tank.

c. Providing a dried albumin (a powdered albumin)

This can be accomplished in any suitable manner, such as spray drying, etc.

d. Preparing a dried albumin and emulsifier slurry mixture

This is accomplished by adding the emulsifier slurry mixture (prepared by step (a) as described above) to a mixing vessel and then heating this to about 42–45° C. Then the powdered albumin is added, with this being mixed into the slurry, maintaining a temperature of 35 to 42° C. The mixing is continued until a homogenous mixture is obtained.

e. Adding the yolk premix

The yolk premix is added to the mixture of dried albumin and emulsifier slurry from the mixture resulting from step "c", and is mixed into the mixture by conventional method until a homogenous mixture is obtained.

f. Removing entrained air

This is accomplished by adjusting the mix temperature to 32–35° C. and creating a vacuum of 17–19 inches for ten minutes with stirring. The vacuum source is turned off, and the mixture is brought back to atmospheric pressure by purging with $CO_2$ gas. The mixture is cooled to 10–15° C. and transferred to a holding tank. After this the mixture is packaged in an air-tight container.

EXAMPLE 1

374 kilograms of raw yolk was removed from fresh eggs, and this was mixed with 61 kilograms of conventional commercially available albumen powder. The liquid yolk component and the albumen powder component were mixed as described in a description of the first embodiment by means of Centrisol machine described previously in this text. This resulted in the liquid egg concentrate of the present invention. This liquid egg concentrate was reconstituted and tested as part of the whip test as described earlier in the text of this application under "egg concentrate". The specific gravity of the egg concentrate as measured by this whip test was only slightly lower (about 5%) than the specific gravity of whole eggs subjected to the same test I described previously in this text.

EXAMPLE 2

An egg concentrate was prepared in the same manner as noted in the example 1, and this concentrate was used to make a sponge cake. This was done by placing into a bowl about 140 grams of the egg concentrate and 140 grams of water. Also 190 grams of sugar was added. These ingredients were mixed together for one minute using a N-50 Hobart mixer with the wire whip at first speed. Then the mixture was sped up to level 3 and whipping continued for 4 minutes. The mixed ingredients were placed in a bowl. Then 30 grams of oil were added in the bowl and mixed in by hand, 20 grams of liquid milk was deposited in the bowl and mixed by hand, and finally 150 grams of cake flour was deposited in the bowl and mixed by hand. Then this batter was baked in a conventional manner to make the sponge cake.

Then a control cake was made in the same manner, except that instead of starting with 140 grams of the concentrate of the present invention and 140 grams of water, 280 grams of whole pasteurized egg were used. Then the sugar was added and the mixture was then mixed by a Hobart mixer as described above, and the oil, liquid milk and flour added in the quantities in the same manner as described above. The resulting batter was also used to make the control sponge cake in the conventional manner.

The two cakes were substantially the same, and for all practical purposes identical. The pieces of cake taken from the control cake and also those from the cake made in accordance with the present invention were indistinguishable.

Also, in making the cake using the egg concentrate of the present invention, the specific gravity of the egg concentrate after it had been mixed with water and the sugar and whipped with the Hobart mixer as described above was measured. This specific gravity was 0.28. In like manner, the specific gravity of the whole egg and sugar, after being whipped with the Hobart mixer and described above, was measured. This was found to be 0.27.

EXAMPLE 3

The egg concentrate of the present invention was used with a "Bunge" white cake base number 2010 (a commercially available cake mix) to make a cake. Also a cake was made in the conventional manner (using fresh whole eggs) and using the same Bunge commercial cake mix. First, a control cake was made by following the directions. The ingredients used are as follows: white cake base mix 10 lb., water 1 lb. 10 oz., liquid whole eggs 2 lb., additional water (variable) 2 lb.

The first step in making the control cake was to pour the water into the mixing bowl and then add the cake base. This is blended at 1 minute on the first speed. Then it is blended for 4 minutes on the third speed of a four-speed machine.

Next, the whole eggs were placed in the bowl and these were mixed with the flour and water mix for one minute with the mixer at first speed. Then the bowl was scraped down by scraping off the food mixture that had accumulated on the side of the bowl. Then the mixture was creamed for 3 minutes on third speed.

In the third stage, the two lb. of water were incorporated into the mix with the mixing machine being operated for 1 minute on first speed. Again there was a scrape down, and the mix was creamed for 2 minutes on second speed of the four-speed machine.

Then the batter was baked into several cakes.

To make the cake batter using the egg concentrate of the present invention, substantially the same process was followed as described above relative to making the control cake with the Bunge cake mix, with the following variations. First, as in the control cake, the 10 lb. of cake mix and the 1 lb. 10 oz. of water were mixed as in the control cake. Then for the second stage, there was first added 1 lb. of the egg concentrate and 1 lb. of the water, and this was mixed for 1 minute at first speed. Then the bowl was scraped. Then the mixture was creamed on second speed for 3 minutes. Then the two pounds of water was incorporated and mixed at the first speed for 1 minute, followed by a scrape down, and then mixing at the second speed for 3 minutes on first speed.

The control cake mix and the cake mix using the concentrate of the present invention were prepared simultaneously using the same type of pans, same weight, same heat, etc. The two cakes (the control cake and the cake made in accordance with the present invention) had very similar crumb and crust structure and there was essentially no difference between the two cakes.

EXAMPLE 4

An egg concentrate of the present invention was made incorporating ingredients to lower the water activity of the concentrate and thus provide it with a long shelf life. The liquid component of the egg concentrate was made by first placing 500 grams of the liquid yolk in a bowl, and then adding 50 grams of corn syrup. This mixture was stirred with a spoon to mix the corn syrup with the liquid whole yolk. Then 300 grams of sucrose was deposited into the bowl. The contents of the bowl were maintained at about 120° F. to enable the 300 grams of sucrose to more readily dissolve into the liquid yolk. The 300 grams of sucrose and the liquid yoke with the corn syrup already dissolved therein was mixed by means of a spoon. Then 50 grams of salt was deposited into the bowl and again the contents of the bowl were mixed with a spoon to dissolve the salt into the liquid yolk mix. The total weight of this liquid component was 900 grams.

Then the 900 grams of the liquid component was mixed with 100 grams of dried powdered albumen by using the Braun Hand Mixer described earlier in this text. The result was an egg concentrate made in accordance with the fourth embodiment of the present invention. This was sealed in a plastic container.

Batches of this egg concentrate, made in accordance with this example 4 were stored in plastic packages unrefrigerated for two months and longer. After being opened, some of these were used to make bakery products. It was found there has been no detectable loss of function. More specifically, the overall structure, volume and appearance of the cakes made with this concentrate were substantially the same as the control cakes made with pasteurized whole eggs.

For purposes of comparison, a batch of control muffins were made in accordance with the conventional manner with whole pasteurized eggs. Then the same type of a batch of muffins was made except that the egg concentrate mix of the present invention was used, and the components of the first conventional muffin mix were varied only to the extent so that those ingredients or portions of ingredients that were in the egg concentrate of the present invention were not included in the ingredients that were added to the egg concentrate of the present invention to make the final batch of muffins.

First, the manner in which the control muffin mix was made and how this mix was made into muffins is as follows.

There was first provided an emulsifier premix (paste) with the following ingredients, given in grams.

| Distilled Monogylaride | 3.8 |
|---|---|
| Propylene glycomonoester | 1.9 |
| (Water in Emulsifier) | 14.2 |
| TOTAL WEIGHT | 19.8 |

This quantity can be rounded out to 20 grams.

Next there was provided a number of components identified as "key mix" (solids):

| SSL (Emulsifier concentrate) | 1.3 |
|---|---|
| Xanthan Gum | 3.5 |
| WPC-35 (Whey protein concentrate) | 26.9 |
| Sod. BiCarbonate | 5.7 |
| BL-60 (Leavening agent) | 5.3 |
| MonoCaPhosphate (Leavening agent) | 0.8 |
| Starch Melogel | 19.4 |
| Giv. 5314 (Vanilla flavor) | 2.4 |
| Dextrose | 8.8 |
| Salt | 11.0 |
| SDA (Dry Powdered Albumen) | 2.5 |
| TOTAL | 87.6 |

This is rounded out to 88 grams.

The ingredients noted above were then mixed with the following main ingredients:

| Sugar | 349 |
|---|---|
| Top Patent Flour | 342 |
| Liquid Egg | 275 |
| Water in Bowl | 190 |
| Oil | 236 |
| TOTAL | 1392 |

The total of 1392 grams plus 20 grams plus 88 grams equals 1500 grams of total ingredients.

The muffin mix was made as follows:

A mixing bowl was provided, along with a mixing paddle. The sugar, top patent flour and key mix were deposited in the bowl dry and mixed for 1 minute with the paddle. Then there was added to the mixture in the bowl the liquid eggs, the water, the emulsifier paste and the oil. Then these ingredients were mixed for 1 minute at low and 4 minutes on second speed. This resulted in the muffin batter. Then the portions of the muffin mix were placed in muffin cups and baked in the usual manner.

In order to make a muffin mix to be mixed with the egg concentrate having the formulation given above in this Example 4, the following changes were made.
  a) The three ingredients of emulsifier premix remain the same.
  b) All of the ingredients listed under "key mix (solid)" remain the same, except that the last three items, namely the dextrose, the salt, and the SDA (albumen powder) were deleted, since these same ingredients appear in the egg concentrate of the present invention.
  c) The amount of sucrose was reduced from 349 grams to 282 grams, since sucrose is in the concentrate.
  d) The liquid egg, in the amount of 275 grams was omitted.
  e) The 190 grams of water was increased to 336 grams of water to provide the extra water that is needed to make up for the water deleted from the egg components of the egg concentrate of the present invention.

Then to make the egg muffin mix using the egg concentrate of the present invention, 220 grams of the concentrate described above in this Example 4 was used. Substantially the same procedure was followed as in making the conventional muffin mix batter, in that initially the sugar, the top patent flour and the control key mix were mixed dry for 1 minute, then the 220 grams of the egg concentrate of the present invention was added, along with the increased amount of water, the emulsifier paste and the oil and this was mixed for 1 minute at low and 4 minutes on second speed for the mixer. The resulting batter was then placed in muffin cups and baked in the same manner as the control mix.

EXAMPLE 5A

The same procedure was followed as in Example 4 in making the concentrate of the present invention, except that half of the dried albumen component was deleted and in place thereof the same amount by weight of whey protein concentrate was substituted. Then the same procedure was followed as indicated above. A quite satisfactory food product, somewhat different in taste in taste in specific qualities was made using this concentrate.

EXAMPLE 5B

The same procedure was followed as an Example 5 and also Example 4, except that the entire dried albumen content was deleted and was replaced by an equal amount by weight of the whey protein concentrate. Again, a quite satisfactory food product was produced from this concentrate, as in Example 5A.

EXAMPLE 6

The egg concentrate of the present invention was first prepared by placing 100 grams of water into a mixing container and heating the water to 165°. 250 grams of sugar were added and the mixture was stirred until the sugar was dissolved. Then 7 grams of sodium steroyl-2-lactylate was added and also 7 grams of soft DATEM were added. Then the mixture was stirred until the emulsifier was dispersed throughout the liquid. The mixture was permitted to cool, and it was then brought to a temperature of about 110° F. 250 grams of liquid egg yolk at 130° F. were added, along with 10 grams of propylene glycolmonoester, and the mixture was stirred until a homogeneous mixture was formed. Then 50 grams of powdered egg albumin was added to the mixture, and then was mixed to form a homogeneous mixture. The resulting mixture (which is the egg concentrate of the present invention) was then permitted to cool.

EXAMPLE 6A

The egg concentrate premix made in accordance with Example 1 was then used to conduct a controlled experiment as follows. First, a typical prior art pound cake was made using the following ingredients:

| Cake flour | 180 g |
|---|---|
| Butter | 148 g |
| Liquid egg | 160 g |
| Water | 260 g |

-continued

|  |  |
|---|---|
| Sugar | 271 g |
| Baking Powder | 10 g |
| Salt | 3 g |

These ingredients were mixed for two minutes at speed 1 and for four minutes at speed 2 with a paddle in a Hobart mixer. The batter (1,000 g) was scaled into 3.5×8 inch pans and baked for 33 minutes at 360° F. in a conventional oven.

Then a cake mix was prepared using the egg concentrate premix prepared in accordance with Example 1 to make a similar pound cake, and the ingredients were as follows:

|  |  |
|---|---|
| Cake flour | 180 g |
| Butter | 148 g |
| Concentrate of Ex. 6 | 80 g |
| Water | 375 g |
| Sugar | 250 g |
| Baking Powder | 10 g |
| Salt | 3 g |

These ingredients were then mixed in the same manner as the above conventional ingredients for the pound cake, and also placed in a 3.5×8 inch pans and baked for 33 minutes at 360° F. in a conventional oven.

A comparison of the two pound cakes was made, and the results were as follows:

|  | Cake Made With Control Mix | Cake Using Present Invention |
|---|---|---|
| Cake Height | 2.52 | 2.66 |
| Appearance | Flat | Good Dome |
| Grain | Somewhat coarse | Finer, somewhat uneven |
| Color | Yellow | Pale |
| Tenderness | Moderate | Tender |
| Mouth Clearance | Cohesive | Slight Pastiness-OK |

EXAMPLE 7

The egg concentrate premix of the present invention was made in substantially the same manner as in Example 6, except that the following ingredients were not added:

propylene glycolmonoester dry egg albumin sugar 300 grams of water was heated and the distilled monogylceride (iodine value equals 5) was added in the amount of 15 grams. 21 grams each of sodium steroyl-2-lactylate and soft DATEM were added, with this being mixed as described above with regard to Example 1. Then 750 grams of liquid egg yolk at 130° F. was added and mixed to form a homogeneous mixture. The resulting egg concentrate was then used to bake a cake. This was done as a controlled experiment, as presented below.

EXAMPLE 7B

For purposes of comparison, a batch of muffins was made using the concentrate of the present invention, and a second batch of muffins was made using a comparable mix made in accordance for prior art.

The muffins which were made in accordance with the conventional recipe were prepared as follows. The following ingredients were mixed:

|  |  |
|---|---|
| Bunge R & H Muffin Mix | 267 g |
| Liquid egg | 93 g |
| Canola oil | 80 g |
| Water | 60 g |

These ingredients were mixed for one minute with a Hobart mixer in a five quart bowl at speed 1 and three minutes at speed 2. The batter was measured out into four ounce paper cup liners in a four ounce muffin pan, 125 G/liner, and these were baked 21 minutes at 310° F. in a conventional oven.

Then a comparable batch of muffins were made using the ingredients of the present invention as follows:

|  |  |
|---|---|
| Bunge R & H Muffin Mix | 267 g |
| Egg concentrate of Example 2 | 14 g |
| Canola oil | 80 g |
| Water | 116 g |
| Dry egg albumen | 6.6 |

The ingredients immediately above were mixed in the same manner as noted above and cooked the same as the conventional batch of muffins used as a control batch. The muffins in the control batch were 2.7 inches high, and the muffins made in accordance with the present invention were 2.71 inches high. Both batches had similar attractive appearance and negligible spread. The muffin made with the present invention had a more fine grain, were lighter in color and had fewer tunnels. Also, the muffins made with the present invention were more tender, but slightly more pasty (less cohesive) than the conventional muffins which made up the control batch.

EXAMPLE 8

The egg concentrate premix of the present invention was prepared in substantially the same manner as the egg concentrate premix of Example 6, with the following exceptions.

15 grams of distilled monogylceride, IV=5 were used instead of 5 grams.

Only 5 grams of soft DATEM was used instead of 7 grams.

15 grams of propylene glycolmonoester were used instead of 10 grams.

75 grams of dried egg albumen were used instead 50 grams.

5 grams of triglycerol monostearate was added to the water/emulsifier mixture.

And, 100 grams of Canola oil at 135° F. was added to the mixture of the water/emulsifier slurry and the egg yolk premix.

EXAMPLE 8A

A control cake was made in a conventional manner using liquid egg, and two cakes were made in accordance with the present invention, using the egg concentrate premix made in accordance with Example 3. The control cake was made as follows. First, there was a blend made using the following ingredients:

|  | Control |
| --- | --- |
| Blend: | |
| Cake Flour | 204 |
| Sugar | 223 |
| Shortening | 24 |
| Nonfat Dry Milk | 24 |
| Baking Powder | 11.4 |
| Pregel Waxy Maize Starch | 8.6 |
| Salt | 5 |

Then the following ingredients were added.

|  |  |
| --- | --- |
| Liquid egg | 150 |
| Canola oil | 65 |
| Sugar | 27 |
| Water | 273 |

These were prepared as follows. The ingredients which were to be blended were placed in a Hobart mixer and mixed at speed one for about one minute, with the ingredients to be added being added to the mixture. Then this mixture was mixed at speed 2. This was done in a five quart bowl. The batters were scaled into 7 inch greased pans at 400 grams of batter per pan. These were baked 24 minutes at 300° F. in a conventional oven.

Then some cakes were made in accordance with the present invention, using the following two set of ingredients.

|  | Experiment (1) | Experiment (2) |
| --- | --- | --- |
| Blend: | | |
| Cake Flour | 204 | 204 |
| Sugar | 223 | 223 |
| Shortening | 24 | 24 |
| NonFat Dry Milk | 24 | 24 |
| Baking Powder | 11.4 | 11.4 |
| Pregel Waxy Maize starch | 8.6 | 8.6 |
| Dry egg albumen | 9.5 | 9.5 |

Add:

|  |  |  |
| --- | --- | --- |
| Egg concentrate (present invention) | 48 | 23 |
| Canola oil | 65 | 65 |
| Sugar | 27 | 27 |
| Water | 300 | 305 |

These ingredients of Experiment 1 and 2 were mixed and baked in the same manner as the conventional cake mix.

After the three batches of cakes were baked, a comparison of these cakes yielded the following results:

|  | Experimental | Control | Experimental |
| --- | --- | --- | --- |
| Cake height | 31 mm | 37 mm | 33 mm |
| Tenderness | Some tough | Tender | Some tender |
| Mouth Clearance | Good | Slight Pastey | Some Pastey |
| Grain | Coarse, Some tunnels | Some large holes fine grain | Some holes fine |

EXAMPLE 9

The premix was made in the same manner as in Example 8, except that 40 grams of the powdered egg albumin was used and also 35 grams of whey protein concentrate instead of 75 grams of powdered egg albumin.

The ingredients were mixed and the cakes made in the same manner as the conventional cake, but using the premix of Example 4.

EXAMPLE 9A

Then the cake mix adapted for retail consumption was made in accordance with the present invention, and also in the conventional manner. This was done as follows. The conventional cake mix had the following ingredients.

|  |  |
| --- | --- |
| Betty Crocker Pecan Cake Mix | 520 g |
| Canola Oil | 70 g |
| Water | 275 g |
| Liquid egg | 150 g |

The cakes were baked in 9×13 inch pans according to the retail directions in a home style oven.

Upon cooling, the cakes were observed. The height was measured, and the cakes were tasted. The conventional cake had a height of 1.50 inches and the cake of the present invention had a height of 1.71 inches (average of five measurements—center and one inch from each corner). The cake of the present invention was much more tender. Otherwise both cakes were indistinguishable.

The above text describes prepared embodiments of the present invention, and is obvious that various modifications could be made to the present invention without departing from the basic teachings of the present invention.

EXAMPLE 10

An egg concentrate of the present invention was made to be used in making mayonnaise. The formulation for the egg concentrate was as follows:

|  |  |
| --- | --- |
| Liquid egg yolk | 239 lbs. |
| SDA (dried albumen powder) | 23 lbs. |
| Salt | 38 lbs. |

The egg concentrate was prepared generally as described previously herein in Example 4.

Then this was incorporated in a mayonnaise formulation where the egg concentrate was 65.8 lbs., and the total formulation and the characteristics of the same is indicated as below:

| | |
|---|---|
| Egg Concentrate | 65.8 |
| Sugar | 4.0 |
| Salt | 1.4 |
| Vinegar | 55.0 |
| Oil (1) | 450.0 |
| Oil (2) | 136.0 |
| Water | 37.9 |
| Total | 750 |
| Total Liquid Yolk (7%) | 70 |
| Specific Gravity | 0.91 |
| Viscosity | 177000 cp |
| Appearance | Normal |
| Taste | Typical |

Then a similar conventional mayonnaise mix was prepared in accordance with the following formulation. This formulation and results of the same are given below:

| | |
|---|---|
| Liquid Whole Egg | 71.6 |
| Liquid Yolk | 23.9 |
| Sugar | 4.0 |
| Salt | 9.6 |
| Vinegar | 55.0 |
| Oil (1) | 450.0 |
| Oil (2) | 136.0 |
| Water | 0.0 |
| Total | 750 |
| Total Liquid Yolk (7%) | 70 |
| Specific Gravity | 0.91 |
| Viscosity | 102000 cp |
| Appearance | Normal |
| Taste | Typical |

The procedure by which the mayonnaise formulations was made is as follows:

1) Weigh ingredients.
2) Combine liquid egg yolk and liquid egg; or egg concentrate; and water, sugar and salt in a 200 ml beaker.
3) Place stir bar into beaker and stir for 10 minutes for full absorption.
4) Transfer the contents into the food processor.
5) Insert the funnel into the spout of the food processor.
6) Wrap plastic wrap around the funnel and spout to prevent spillage during mixing.
7) Turn on the blender.
8) Blend for 1 minute and then begin to add vegetable oil—1 through the funnel. (Duration will be approximately 2½ minutes).
9) Add the vinegar to vegetable oil—2. Mix well to disperse the vinegar.
10) Add the oil/vinegar mixture to the blender through the funnel. (Duration will be approximately 1 minute).
11) Once all of the oil/vinegar mixture is incorporated, stop the blender and scrape down the lid and wall.
12) Blend for 2 more minutes.
13) Place about 500 ml mayonnaise into the 500 ml glass beaker and the remainder into the glass bottle. Ensure that there are no large air pockets inside.
14) Allow mayonnaise to sit for at least two hours before performing the viscosity test.

This text describes various preferred embodiments and features of the present invention and these are not to limit the invention to this particular disclosure. Rather, it is to be understood that various modifications, additions, variations could be made without departing from the basic teachings of the present invention.

What is claimed is:

1. A liquid egg concentrate comprising:
    a. a liquid egg component comprising predominantly liquid yolk;
    b. a particulate solid component comprising predominantly dried particulate albumen;
    c. said concentrate being characterized in that the particulate solid component is dispersed throughout said liquid egg component, and said concentrate can be readily mixed with water to make a concentrate/water mixture.

2. The concentrate as recited in claim 1, wherein said concentrate has a foaming capability that is such that when the concentrate is subjected to a whip test, the specific gravity of the product developed by the whip test has a specific gravity no greater than 0.6.

3. The concentrate as recited in claim 2, wherein said concentrate has a foaming capability that is such that when the concentrate is subjected to a whip test, the specific gravity of the product developed by the whip test has a specific gravity no greater than 0.5.

4. The concentrate as recited in claim 2, wherein said concentrate has a foaming capability that is such that when the concentrate is subjected to a whip test, the specific gravity of the product developed by the whip test has a specific gravity no greater than 0.4.

5. The product as recited in claim 1, wherein the product resulting from said whip test has a specific gravity between about 0.25 and 0.35.

6. The concentrate as recited in claim 1, wherein said concentrate further comprises an ingredient or ingredients which lowers water activity of the concentrate to a level which substantially inhibits activity of microorganisms in the concentrate to enhance shelf life of the concentrate.

7. The concentrate as recited in claim 6, wherein said ingredient or ingredients comprises at least one or more of sugar, sugars, salt, salts, or combinations thereof.

8. The concentrate as recited in claim 7, wherein said sugar or sugars comprises one or more of sucrose, glucose, fructose, dextrose, lactose, maltodextrin or combinations thereof, and said salt or salts comprises one or more of sodium chloride, calcium chloride, potassium chloride, citric, lactic, sorbic, malic, adipic, fumaric or other food grade organic acids, potassium sorbate, sodium or calcium proprionate, sodium benzoate or combinations thereof.

9. The concentrate as recited in claim 7, wherein said salt or salts comprises one or more of sodium chloride, calcium chloride, potassium chloride, citric, lactic, sorbic, malic, adipic, fumaric or other food grade organic acids, potassium sorbate, sodium or calcium proprionate, sodium benzoate or combinations thereof.

10. The concentrate as recited in claim 7 wherein said sugar or sugars comprise one or more of sucrose, glucose, fructose, dextrose, lactose, maltodextrin or combinations thereof.

11. The concentrate as recited in claim 1, wherein the weight of the particulate solid component is between about 10–35% of the total weight of the liquid egg component and the particulate solid component.

12. The concentrate as recited in claim 11, wherein the percent weight of the particulate solid component is between about 12–30%.

13. The concentrate as recited in claim 11, wherein the percent weight of the particulate solid component is between about 14–25%.

14. The concentrate as recited in claim 11, wherein the percent weight of the particulate solid component is between about 16–20%.

15. A liquid egg concentrate comprising:
  a) a liquid egg component comprising predominantly liquid yolk;
  b) a particulate solid component comprising predominantly dried particulate albumen;
  c) an ingredient or ingredients which lowers water activity of the concentrate to a level which substantially inhibits activity of microorganisms in the concentrate to enhance shelf life of the concentrate;
  d) said concentrate being characterized in that the particulate solid component is dispersed throughout said liquid egg component is dispersed throughout said liquid egg component, and said concentrate can be readily mixed with water to make a concentrate/water mixture.

16. The concentrate as recited in claim 15, wherein said concentrate has a foaming capability that is such that when the concentrate is subjected to a whip test, the specific gravity of the product developed by the whip test has a specific gravity no greater than 0.6.

17. The concentrate as recited in claim 16, wherein said concentrate has a foaming capability that is such that when the concentrate is subjected to a whip test, the specific gravity of the product developed by the whip test has a specific gravity no greater than 0.5.

18. The concentrate as recited in claim 16, wherein said concentrate has a foaming capability that is such that when the concentrate is subjected to a whip test, the specific gravity of the product developed by the whip test has a specific gravity no greater than 0.4.

19. The product as recited in claim 16, wherein the product resulting from said whip test has a specific gravity between about 0.25 and 0.35.

20. The concentrate as recited in claim 15, wherein said concentrate further comprises an ingredient or ingredients which lowers water activity of the concentrate to a level which substantially inhibits activity of microorganisms in the concentrate to enhance shelf life of the concentrate.

21. The concentrate as recited in claim 20, wherein said ingredient or ingredients comprises one or more of sugar, sugars, salt, salts, or combinations thereof.

22. The concentrate as recited in claim 20, wherein said sugar or sugars one or more of sucrose, glucose, fructose, dextrose, lactose, maltodextrin, or combinations thereof, and said salt or salts comprising one or more of sodium chloride, calcium chloride, potassium chloride, citric, lactic, sorbic, malic, adipic, fumaric or other food grade organic acids, potassium sorbate, sodium or calcium proprionate, sodium benzoate or combinations thereof.

23. The concentrate as recited in claim 21, wherein said salt or salts comprises one or more of sodium chloride, calcium chloride, potassium chloride, citric, lactic, sorbic, malic, adipic, fumaric or other food grade organic acids, potassium sorbate, sodium or calcium proprionate, sodium benzoate or combinations thereof.

24. The concentrate as recited in claim 21, wherein said sugar or sugars comprise one or more of sucrose, glucose, fructose, dextrose, lactose, maltodextrin or combinations thereof.

25. The concentrate as recited in claim 15, wherein the weight of the particulate solid component is between about 10–35% of the total weight of the liquid egg component and the particulate solid component.

26. The concentrate as recited in claim 25, wherein the percent weight of the particulate solid component is between about 12–30%.

27. The concentrate as recited in claim 25, wherein the percent weight of the particulate solid component is between about 14–25%.

28. The concentrate as recited in claim 25, wherein the percent weight of the particulate solid component is between about 16–20%.

\* \* \* \* \*